Jan. 18, 1927.　　　　　　　　　　　　　　　　　1,615,195
J. G. SWAB
AUTOMATIC FASTENER AFFIXING MACHINE
Filed August 16, 1923　　　7 Sheets-Sheet 1

Inventor
Jay G. Swab
By his Attorneys
Emery Booth Janney & Varney

Jan. 18, 1927.  
J. G. SWAB  
1,615,195  
AUTOMATIC FASTENER AFFIXING MACHINE  
Filed August 16, 1923  7 Sheets-Sheet 2

Inventor  
Jay G. Swab  
By his Attorneys  
Emery Booth Janney & Varney

Inventor
Jay G. Swab
By his Attorneys
Emery Booth Janney & Varney

Jan. 18, 1927.                                       1,615,195
J. G. SWAB
AUTOMATIC FASTENER AFFIXING MACHINE
Filed August 16, 1923      7 Sheets-Sheet 4

Inventor
Jay G. Swab
By his Attorneys

Jan. 18, 1927.

J. G. SWAB 1,615,195

AUTOMATIC FASTENER AFFIXING MACHINE

Filed August 16, 1923     7 Sheets-Sheet 6

Inventor
Jay G. Swab
By his Attorneys
Emery Booth Janney & Varney

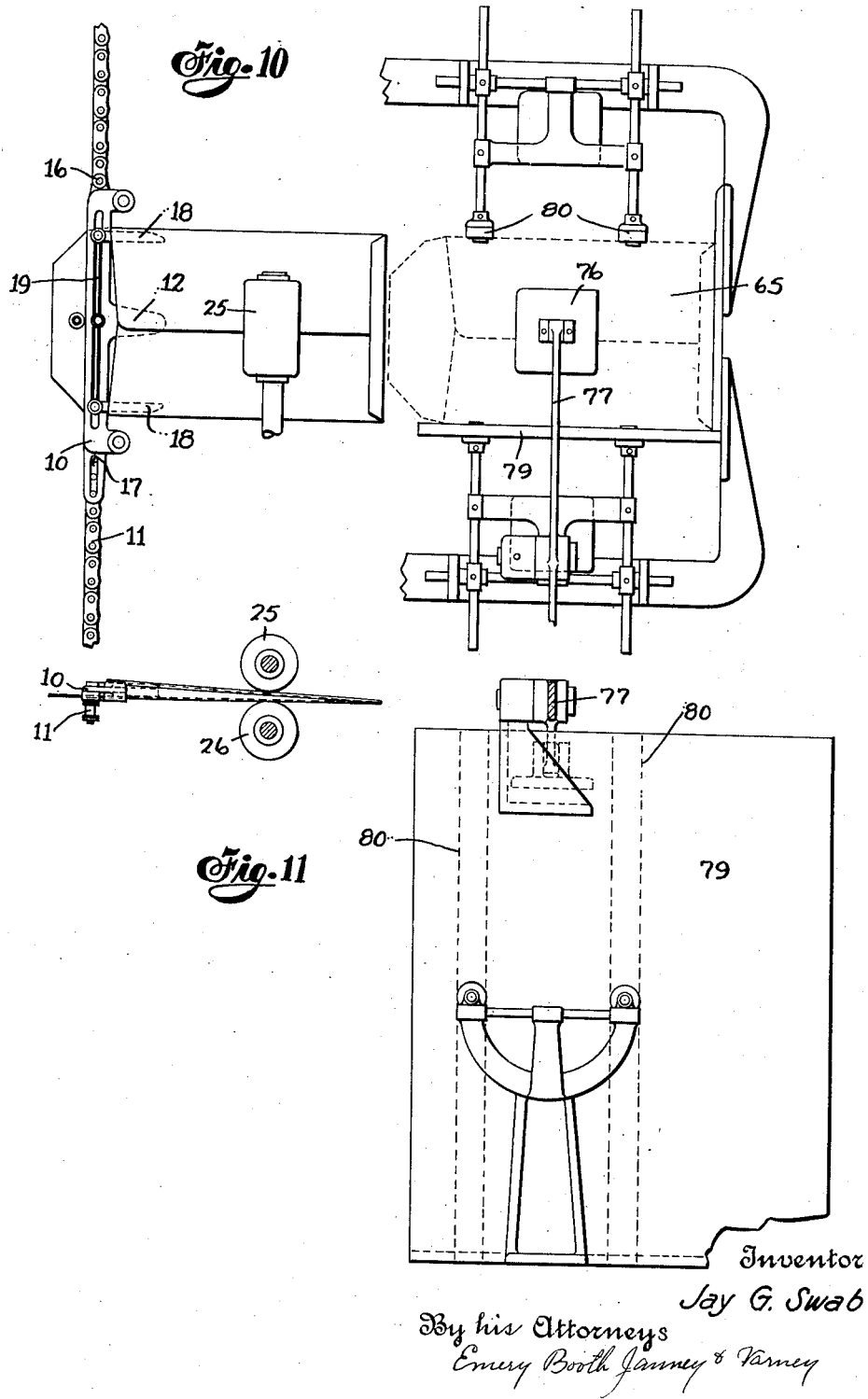

Patented Jan. 18, 1927.

1,615,195

UNITED STATES PATENT OFFICE.

JAY G. SWAB, OF BROOKLYN, NEW YORK, ASSIGNOR TO HENRY TRENCHARD, JR., OF BROOKLYN, NEW YORK.

AUTOMATIC FASTENER-AFFIXING MACHINE.

Application filed August 16, 1923. Serial No. 657,689.

The present invention relates to apparatus for operating on such articles as envelopes for example, and is directed more especially to mechanism for feeding the work to position where it is operated upon. It is an object of the invention to provide an improved feeding mechanism which will bring articles such as envelops accurately to position to be operated upon.

The present particular embodiment of the invention has been developed in connection with machines for applying cooperating fastener elements to the body and flap of envelop, and for convenience it will be described in this connection. This description will sufficiently illustrate and indicate the manner in which the principles of the invention may advantageously be applied.

An envelope of the type known as a merchandise envelope is frequently provided with cooperating fastener elements secured respectively to the body and flap in such relation to each other and to the fold of the flap that the flap when folded may be held in closed relation. The fastener devices are of various types, such, for example, as the button and string or the pronged fastener secured to the envelop body and having bendable prongs to extend through a hole in the flap. All of these fasteners of numerous types are commonly secured to the otherwise finished envelop by means of various machines having horns or equivalent elements which enter the envelopes and cooperate with other mechanism to secure fastener elements to the envelop bodies. The envelops are commonly fed to the fastener-affixing mechanism by hand, the operative handling each envelop twice, once to apply it to the horn, and again to remove it. Frequently, the machine is stopped after each fastener-applying operation, and again started by the operative when a fresh envelop is in position.

The use of such machines, not only involves the employment of an operative for each machine, but the output of the machine is limited to the speed and regularity of the operative. Furthermore, the accuracy of the work depends upon the accuracy of the operative in positioning the envelop against the gages, and work is therefore, easily spoiled by a careless operative.

The object of the invention in its present embodiment is to provide an entirely automatic feeding mechanism for controlling envelops or the like in their passage through a machine operating thereon.

The nature and objects of the invention will be better understood from the description of a particular illustrative embodiment thereof, reference being had to the accompanying drawings forming a part hereof. I have selected for the purpose of description, a machine for affixing cooperating fastening means to the body and flap of an envelop together with automatic mechanism for feeding and conveying envelops one by one from a suitable supply to operative position, and then from operative position to a suitable stack.

In the drawings, Figure 1 is a view in side elevation of an apparatus embodying certain principles of the invention and comprising a conveyor mechanism for carrying envelops from a suitable supply to operative position, and from operative position to a point of delivery and stacking them.

Figure 10 is a detail view in side elevation of the mechanism shown in Figure 5.

Figure 11 is a bottom plan view of the mechanism shown in Figure 10.

Figure 1:
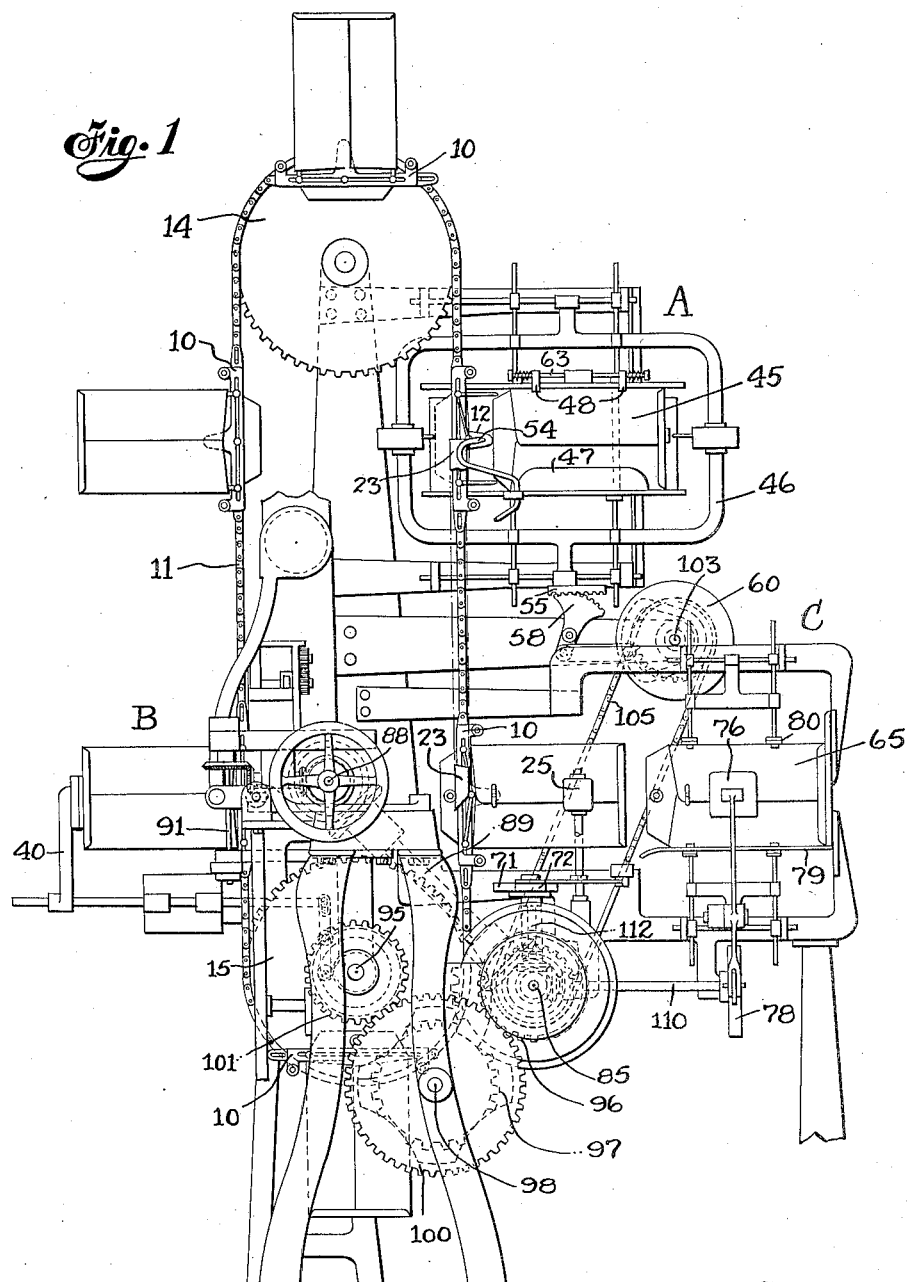

In the machine shown for the purposes of illustrating the invention, there is associated with mechanism for affixing suitable cooperating fastener elements to the body and flap of an envelop, a feeding mechanism which carries the envelops one by one to the position at which the fastener-affixing devices operate thereupon and which conveys the envelops from such position. A fastener of any desired type may be applied and the affixing mechanism may be of any suitable type, such for example as that shown in the patent to Richardson, No. 1,286,413, dated December 3, 1918. As shown in the accompanying drawing, it comprises an eyelet riveting punch 5 for affixing a pronged eyelet to the body of the envelop and a pair of opposed patch die tubes 6, 7 for affixing reinforcing patches to the opposite faces of the flap together with a punch and ejector 8 movable within the patch die tubes for punching a prong receiving hole in the envelope flap and reinforcing washers. It will be unnecessary to describe the fastener-affixing mechanism in detail herein since a complete description thereof may be had by reference to the above-mentioned patent. The manner in which the fastener-applying mechanism is combined with the feeding mechanism will be clear from the following description:

Means are provided for automatically placing an envelop in fastener receiving position, and removing it therefrom. Said means preferably comprises a carrier, or a series of carriers, which move with the envelops to and from operative, fastener receiving position. In the arrangement shown, a series of similar carriers, 10, are supported and actuated by the chain, 11, mounted on sprocket wheels 14, 15, one of which is intermittently driven to move each carrier successively to loading position, A, fastener receiving position, B, and discharging position, C, as indicated in Figure 1.

The arrangement is such that after each intermittent movement of the chain and carriers, a carrier will be found in each of the operative positions, to wit: the loading position, fastener-affixing position, and discharging position, and the loading, fastener-applying, and discharging mechanisms operate simultaneously on different envelops.

By this arrangement the fastener-applying mechanism, or other mechanism operating upon the work while held at the operative position, may be in almost continuous operation, little time being required for the removal of finished work and the feeding of fresh work. In the machine illustrated for example, the shifting of the carriers may be accomplished during about one tenth of a revolution of the main drive shaft, and the remaining time may be occupied in the fastener-applying operation.

As shown, the carriers are all pivotally connected to the chain. One end of each carrier is pivotally connected to a pivot pin of the chain, at 16, and the opposite end is connected by a pin and slot connection, 17, to permit relative longitudinal movement as the carrier passes around either of the sprocket wheels.

Each carrier comprises suitable means for holding the envelop during the conveying operation. In the illustrated arrangement, arms 18, are arranged to enter the envelop and engage the folds thereof. These arms are pressed outward to engage the folds of the envelop, preferably with a yielding pressure which is sufficient to support the envelop in all positions while it is being carried to and from fastener receiving position. In the arrangement shown, the arms, 18, are spread to what may be termed "gripping" position by the toggle links 19, the pivot pin 20 connecting the links being urged to spreading position by means of the spring 21. This pivot pin 20 carries a roller 22, adapted to engage a cam 23, which operates to contract the arms at the loading position. If the end of the cam is so positioned at the loading point that a slight movement upward from loading position will permit the expansion of the arms, then the arms will expand in time to engage the envelop immediately upon upward movement of the carrier. The arms may be slightly contracted before the discharge rolls 25 and 26 operate or these rolls may be arranged to grip the envelop with sufficient force to pull it from the carrier while the arms are in fully expanded position.

The carrier preferably includes an anvil or horn 12 which enters the envelop and against which the fasteners are set. The carrier thus cooperates with the fastener-applying mechanism, in a sense, replacing the horn, heretofore forming a fixed part of the machine.

In order to insure accurate positioning of the envelop during the operation of the fastener-affixing device, each carrier is provided with registering holes 31, 32, which are engaged by suitable registering pins carried in the head which supports the fastener-affixing mechanism. In operation the registering pins are thrust forward to engage and accurately position the carrier and thereafter the fastener-affixing devices operate to affix the fasteners.

Figure 6:
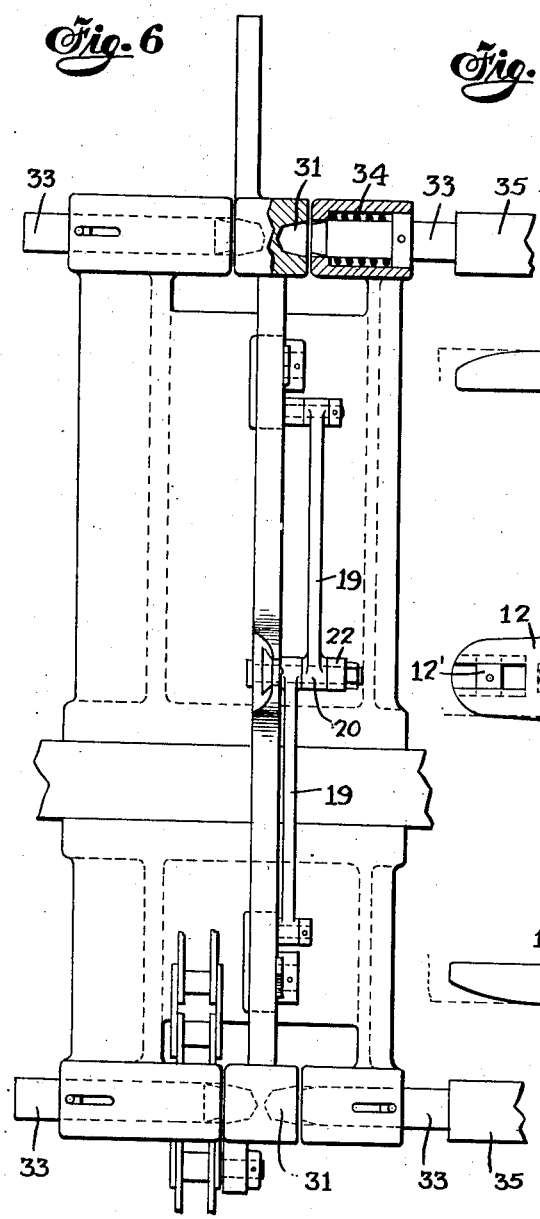
Figure 6 is a detail view in elevation of a carrier and the carrier registering devices.
Figure 7:
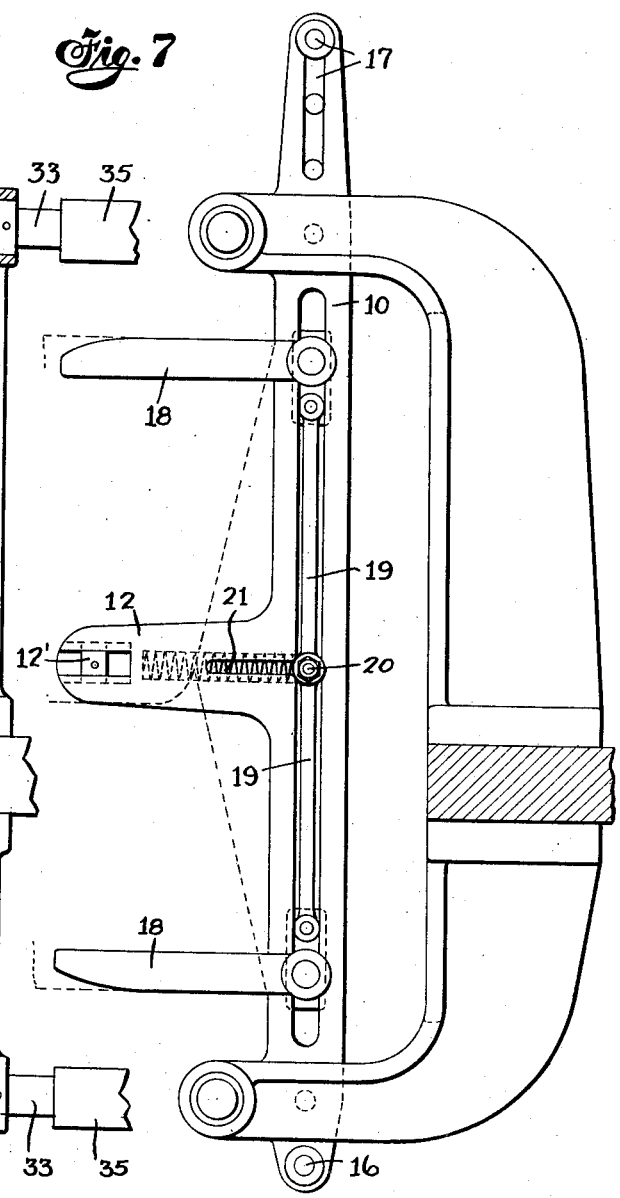
Figure 7 is a side view of the same.
Figure 8:
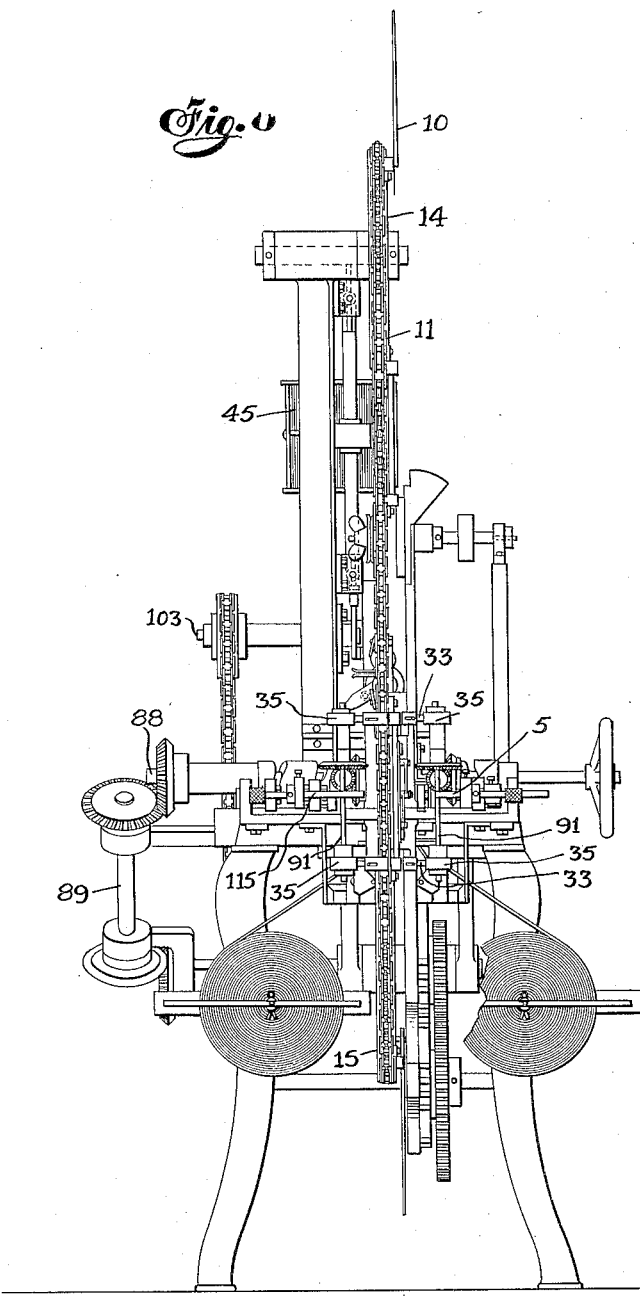
Figure 8 is a view in front elevation of the machine.
Figure 9:
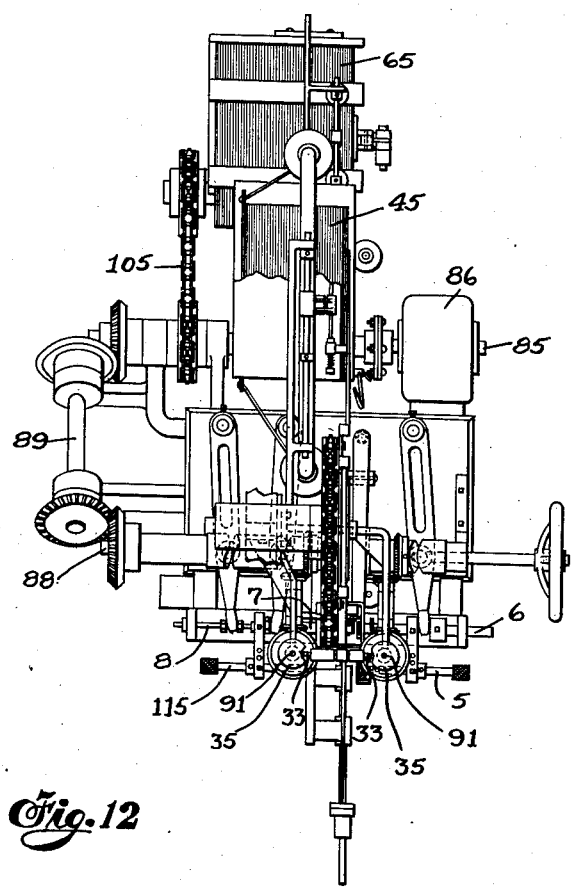
Figure 9 is a plan view of the same.
Figure 12:
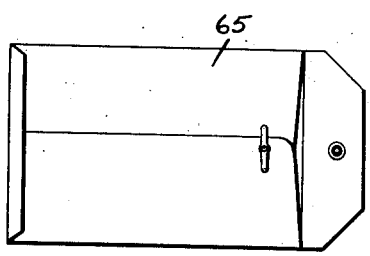
Figure 12 is a view showing an envelop as it leaves the machine with the fastener devices affixed.

The registry pins may be actuated in any suitable manner. In the arrangement illustrated and best shown in Figure 6 opposed tapered registering pins 33 are provided in position to engage the carrier from opposite sides and both at the top and bottom. These pins are normally retracted by springs 34 and are positively projected into operative registering position by cams 35, 35, which are suitably connected to the driving shaft of the machine.

To further insure accurate positioning of the envelop or other work a gauge 40, as shown in Figure 1, is provided which is arranged to move forward and during its movement to engage the rear edge or bottom of the envelop and move it forward to a definite predetermined position. By thus accurately positioning the carrier and also the envelop, accurate position of the fastener is insured.

In the apparatus shown, automatically operating devices are provided for applying the envelops to the carriers successively and for removing the envelops therefrom after the completion of the fastener-affixing operation.

Figure 2:
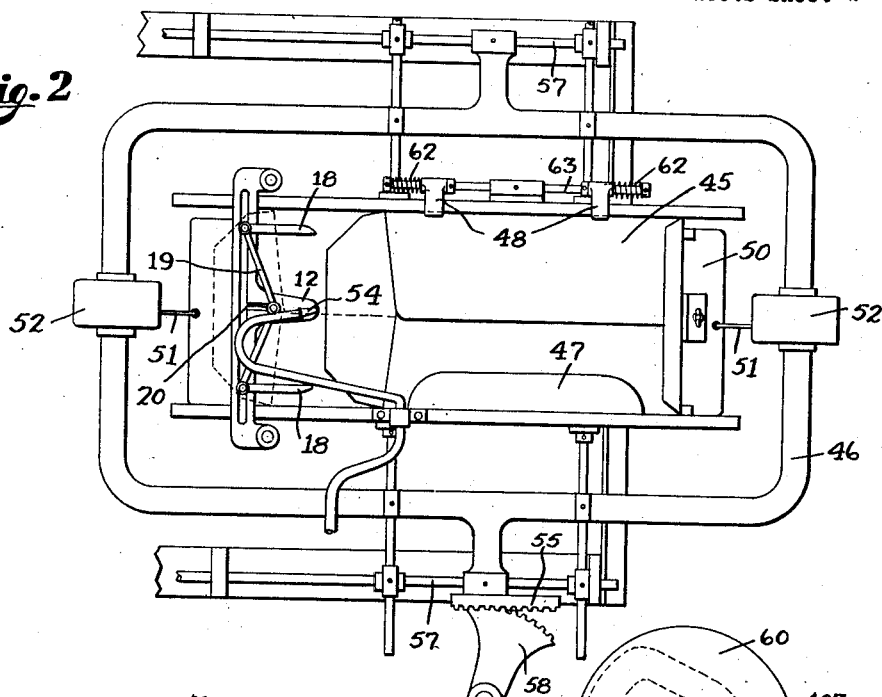
Figure 2 is a detail view on an enlarged scale showing in side elevation the mechanism for feeding the envelops to the carrier which forms a part of the conveyor mechanism.
Figure 3:
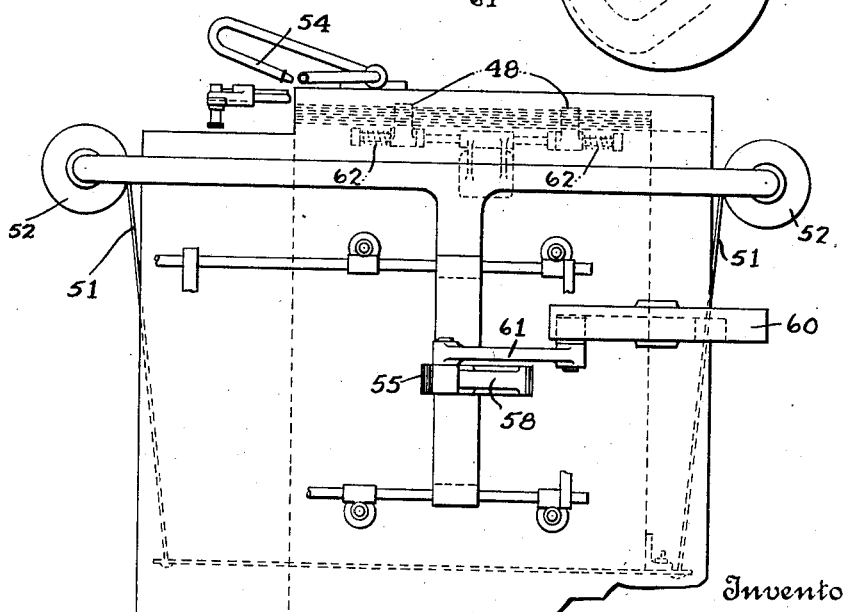
Figure 3 is a bottom plan view of the same.

As shown in Figures 2 and 3, the envelops are fed to, and applied to the carriers by automatically operating mechanism. A stack of envelopes 45 is placed on a suitable support 46, each envelop standing on edge with the back side forward and with the flap extended. The envelops are held in place against a rigid forward stop 47, and yieldable dogs 48, 48, by a follower plate 50 actuated by flexible connections 51 to spring drums 52 52. The stack of envelops is thus supported with the forward envelop in predetermined position.

The position of the stack is such that the conveyor carrier when it arrives at the loading station is closely adjacent to the end of the flap of the envelop. The forward-most envelop is then opened by a blast of air from a nozzle 54, whereupon a relative movement between the carrier 10 and the forward-most envelop causes the carrier arms 18 and the horn 30 to enter the open envelop. The relative movement between the carrier 10 and the forward envelop is obtained by moving the whole stack of envelops bodily toward the conveyor device. For this purpose a rack 55 is provided upon the stack support, which stack support is slidably mounted upon ways 57. The rack is actuated by a segmental gear 58 controlled in turn by a cam, 60 through a link 61, as best shown in Figure 2.

The arms 18 are spread to engage the envelop and move upwardly to carry the envelop from its position on the supply stack. The upward movement of the envelop is permitted by the yieldable dogs 48, engaging the upper edge thereof and which are sufficiently yieldable under control of the springs 62 to permit the envelop as carried by the arms 18 to move upwardly swinging the dogs upon the shaft 63 on which they are pivoted. As soon as the dogs are freed from the edge of the envelop during the upward movement, they snap down again to engage the next envelop. At this time the envelop stack support is again retracted under control of the cam 60 to normal position.

Figure 4:
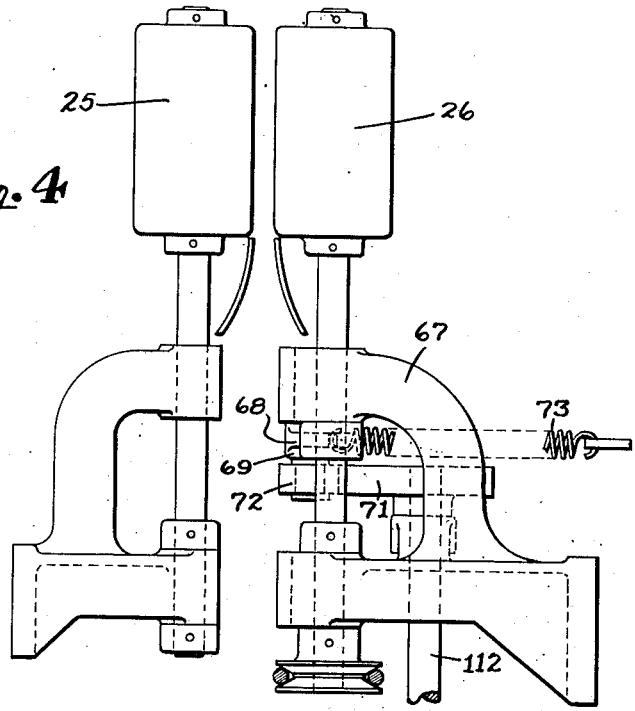
Figure 4 is a detail view in elevation of the feed rolls and operating means therefor.

As an envelop arrives at the discharging station, it is engaged by the parallel discharging rolls 25, 26, which pull the envelop from the carrier and feed it to stacking position in front of the stack 65. The discharging rolls 25, 26 are preferably separated during the movement of the envelop upward to position therebetween and then brought together to engage the envelop for discharging the same. In the arrangement shown, the roll 25 is supported in a slotted frame or bracket 67, and moved forward and back by means of an arm 68, having at its upper end a bearing 69 engaging the roll shaft 70, which arm is actuated by means of a cam 71 engaging a roller 72 at its lower end. As shown in Figure 4, a spring 73 tends to hold the roll 25 yieldably toward the companion roll in envelop gripping position so that the pressure upon the envelop is a yielding pressure. The cam acts positively, however, to separate the rolls during the upward movement of the envelop therebetween.

Figure 5:
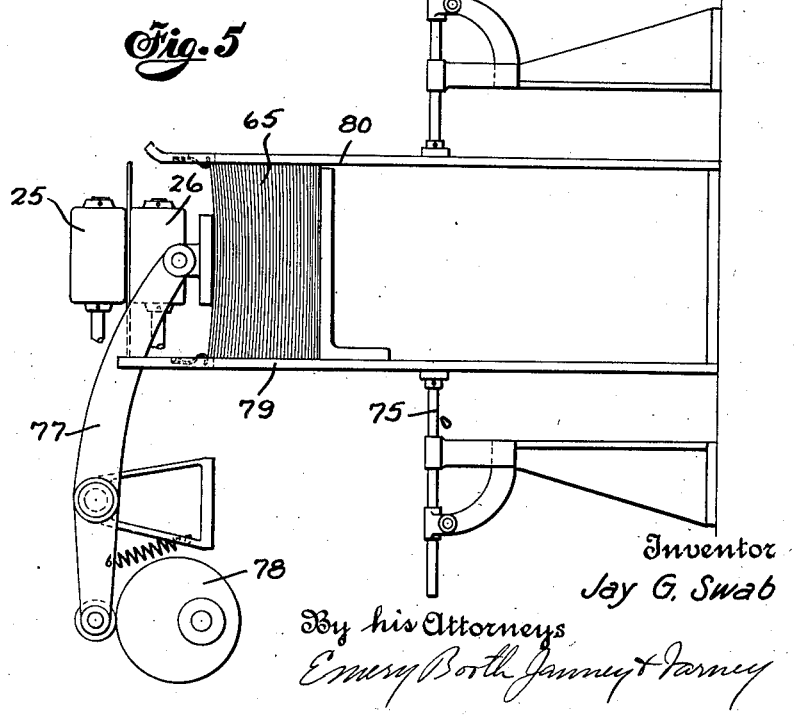
Figure 5 is a detail view in rear elevation showing the mechanism for removing envelops from the carrier of the conveyor mechanism and stacking the same between suitable guides.

The stack of envelops 65 is suitably supported upon an adjustable support 75, which is carried by suitable standard. As the envelop is carried forward by the rolls, 25, 26, a follower 76 carried by arm 77, is retracted by the cam 78, and when the envelop is finally in stacking position, this follower is again moved forwardly to force the stack and especially the forward-most envelop back between the supporting ways 79, 80. These supporting ways as best shown in Figure 5, are preferably spaced apart a distance slightly less than the width of an envelop so that the envelops are frictionally held thereby and are slightly buckled by the action of the follower member 76.

The several associated mechanisms are driven from a main power shaft 85 forming a part of the machine. This power shaft may receive its power from any suitable source, it being shown as driven by a motor 86. The cam shaft 88 controlling the fastener applying mechanism is driven from the main shaft 85 and at the same speed as the main shaft by means of a diagonal shaft 89 suitably connected to the main shaft and to the cam shaft by mitre gears. The vertical cam shafts 91 carrying the cams which actuate the registering pins are connected to be driven from the cam shaft 88 by means of horizontal shafts 92 and bevel gears suitably designed to drive the shafts 91 at the same speed as the main cam shaft 88.

The carrier chain is driven through an intermittent gearing arranged to drive the shaft 95, to which the lower sprocket wheel is secured, one half revolution at a predetermined time during each rotation of the main power shaft. This gearing is shown as comprising the intermittent driving gear 96 on the main power shaft and the driven gear 97 on a jack shaft 98. The jack shaft is in turn connected with the shaft 95 by gears 100, 101. The loading mechanism operating cam 60 is secured to shaft 103 which is positively driven at the same speed as the main power shaft as by means of a sprocket chain 105 and suitable sprocket wheels on the two shafts.

The follower actuating cam 78 of the unloading and stacking mechanism is secured to a horizontal shaft 110 which is driven from the main power shaft by mitre gears. A vertical shaft 112, shown in dotted lines in Figure 1 and in full lines in Figure 4, is similarly driven by mitre gears and to this shaft is secured the cam 71 which controls the position of the movable feed roll 26. This roll is also driven from a pulley on the same vertical shaft.

It is a feature of the machine described that it is readily adaptable to envelops of different sizes as set forth in the patent to Richardson cited. The relative positions of the two fasteners applying mechanisms are adjustable for this purpose. The set or anvil 12′ is dovetailed into the horn 12 to permit adjustment thereof to correspond to the adjustment of the position of the eyelet set 5. The position of the envelop can be adjusted on the carrier by means of a gauge 40 to bring it into proper position relative to the fastener applying devices. Ordinarily such adjustment of the position of the envelop by means of the gauge 40 is sufficient, but if desired adjustable guides may be provided to adjust the position of the chain and the registering devices which position the carrier during the period of operation.

The carriers may be easily adapted to carry envelops of different sizes. In the arrangement shown, the adjustment may be provided by small substitute links of different lengths in order to position the arms when in full extended position to correspond with envelops of different widths. If preferred, separate sets of carriers may be provided for use with envelops of different widths and one set of carriers may be removed from the machine and another set substituted as occasion may require. In making such substitution, the carriers may either be removed from and applied to the chain, or separate chains provided with carriers of the different sizes, may be substituted. The loading and unloading stacks are adjustable to accommodate envelops of different sizes. As shown, the ways which engage the edges of the envelops may be adjusted toward or from each other to accommodate envelops of any desired width.

As above noted the carrier replaces a stationary horn of the Richardson machine. The pressure of the fastener affixing plunger against the anvil of the carrier is considerable and it is desirable to support the horn of the carrier from the opposite side to take the thrust of the fastener affixing plunger. To this end there is provided a plunger 115 which plunger is secured to the washer affixing plunger 7 to move therewith in the same manner that the eyelet setting plunger 5 is secured to the cooperating washer affixing plunger 6. The several cams actuating the washer affixing plungers are suitably designed to bring the supporting plunger and the eyelet riveting plunger into engagement with the horn in proper timed relation.

The operation of the apparatus has been explained in connection with the description thereof, but may be briefly summarized as follows: A stack of envelops is positioned in the loading stack support 46, and the motor 88 on the main drive shaft started. The loading mechanism operates to apply an envelop to that carrier which is positioned at the loading station. In such operation, the forward-most envelop is opened by a blast of air from the nozzle 54 and the stack support is shifted bodily by means of the rack and gear segment 55, 58 to carry the forward-most envelop on the carrier over the arms 18 and the horn 12. The sprocket wheel 15 is then given a half rotation to move all the carriers forward one step. This operation is repeated during each rotation of the main shaft of the machine. After three rotations of the main shaft, the first envelop comes into fastener-applying position, and receives a fastener through the operation of the fastener applying mechanism. As the envelop arrives at this position, it is pushed forward on the carrier by means of the gauge 40, thus accurately positioning the envelop on the carrier and simultaneously the carrier is accurately positioned with respect to the fastener applying mechanism by means of the registering pins 33 which are cam-actuated to enter the registering holes 31, 32 in the carrier. The fastener-applying mechanism including the pronged eyelet set and the washer applying and punching devices are actuated to apply the fastener to the body of the envelop, and the washer to the flap, and punch a hole therein. The horn 12, forming a part of the carrier, cooperates in this operation with the eyelet set to engage the eyelet against the inside of the envelop. After two more rotations of the main drive shaft, the envelop first operated upon arrives at the discharging station C where the rolls 25, 26 grip the envelop and carry it to position in front of the then retracted follower 76 which immediately moves forward and presses the envelop between the supporting ways 79 and 80.

During the continuous operation of the machine, the three mechanisms, i. e. the loading, fastener-affixing, and discharging mechanisms operate simultaneously on different envelops. The machine thus continues its operation automatically with little attention otherwise than maintaining the supply of envelops to and removal of finished envelops from the stacks.

It will be understood that it is not necessary that all of the features of the invention be used conjointly inasmuch as several of the features of the invention are capable of use independently.

I claim:

1. In apparatus of the character described, the combination with means for applying a fastener to an envelop, of means for carrying envelopes successively to and from operative position comprising a series of carriers and means for moving said carriers intermittently and successively to loading position, operative position and unloading position.

2. In apparatus of the character described, the combination with means for operating upon a container, comprising a series of carriers, each carrier comprising an abutment cooperating with the operating means, said carriers being movable to three successive stations for loading, operation and unloading.

3. In apparatus of the character described, the combination with means for operating upon a container of a carrier having a part over which the container is adapted to fit, said carrier being movable to loading position, operating position and unloading position, and means cooperating with said carrier in loading position to apply a container thereto.

4. In apparatus of the character described, the combination with mechanism for operating on an article, of a plurality of movable carriers each constructed to receive and support an article in predetermined position, and means for moving said carriers with the articles thereon successively to operative position, said mechanism being arranged to cooperate with a carrier for operating on said article while in operative position.

5. In apparatus of the character described, the combination with mechanism for operating on envelops of means for feeding envelops one by one to said mechanism comprising a series of carriers movable to and from operative position, each arranged to receive one envelop and each comprising an anvil with which said mechanism cooperates in operating upon an envelop.

6. In apparatus of the character described, the combination with mechanism for operating on envelops, of means for feeding envelops one by one to said mechanism comprising a series of carriers each movable to and from operative position and each comprising a pair of arms adapted to enter and engage the folds of an envelop to support the envelop in predetermined position and each comprising a part with which said mechanism cooperates in operating upon an envelop.

7. In apparatus of the character described, the combination with mechanism for operating on an envelop of means for feeding envelops one by one to said operating mechanism comprising a carrier and means movable into engagement with said envelop when in position to be operated upon for registering the envelop on the carrier with respect to the operating mechanism.

8. In apparatus of the character described, the combination with mechanism for operating on an envelop of means for feeding envelops one by one to said operating mechanism comprising a carrier having arms adapted to enter the envelop and to engage the folds thereof to support the envelop on the carrier and means movable into engagement with the envelop when in operative position to move the envelop on the carrier into registering position with respect to the operating mechanism.

9. In apparatus of the character described, the combination with mechanism for operating on envelops of means for feeding envelops one by one to said mechanism comprising a series of carriers movable to and from operative position, each arranged to receive one envelop and each comprising an anvil with which said mechanism cooperates in operating upon an envelop, and means engageable with the carrier at operative position to register the carrier with respect to the operating mechanism.

10. In apparatus of the character described, the combination with mechanism for operating on envelops of means for feeding envelops one by one to said mechanism comprising a carrier and means engageable with the carrier at operative position to register the carrier with respect to the operating mechanism.

11. In apparatus of the character described, the combination with mechanism for applying fastener devices to a container of means for feeding containers one by one to fastener receiving position comprising a series of carriers and means for applying a container to a carrier before the carrier moves to fastener receiving position, and means for removing the container from said carrier after the carrier leaves fastener receiving position.

12. In apparatus of the character described, the combination with mechanism for applying fastener devices to a container of means for feeding containers one by one to fastener receiving position comprising a series of carriers each carrier comprising an anvil with which said fastener applying mechanism cooperates to apply a fastener device to the container in fastener receiving position and means for applying a container to a carrier before the carrier moves to fastener receiving position, and means for removing the container from said carrier after the carrier leaves fastener receiving position.

13. In apparatus of the character described for applying closure fasteners to containers, the combination with fastener applying means of means for feeding containers one by one to said fastener applying mechanism and holding them in position for operation thereon comprising a series of carriers each movable to and from fastener applying position together with means for registering the container in fastener receiving position.

14. In apparatus of the character described the combination with means for applying cooperating fastener devices to the body and closing flap of a container in predetermined relation to each other, of means for feeding containers one by one to the fastener applying devices comprising a series of carriers each adapted to be inserted into a container to hold it in suitable relation and position for operation of the fastener applying means.

15. In apparatus of the character described the combination with means for applying cooperating fastener devices to the body and closing flap of a container in predetermined relation to each other, of means for feeding containers one by one to the fastener applying devices comprising a series of carriers, each carrier comprising an anvil insertable into the container to cooperate with the fastener applying devices in applying fasteners to said containers.

16. In apparatus of the character described the combination with means for applying cooperating fastener devices to the body and closing flat of a container in predetermined relation to each other, of means for feeding containers one by one to the fastener applying devices comprising a series of carriers each adapted to be inserted into a container to hold it in suitable relation and position for operation of the fastener applying devices thereon, and means for applying containers to said carriers and removing them therefrom.

17. In apparatus of the character described, the combination with means for applying cooperating fastener devices to the body and closing flap of a container in predetermined relation to each other, of means for feeding containers one by one to the fastener applying devices comprising a series of carriers, each carrier comprising an anvil insertable into the container to cooperate with the fastener applying devices in applying fasteners to said containers, and means for applying a container to a carrier and means movable into engagement with a container when in operative position for moving the container into registering position to receive the fastener devices.

18. In a machine of the character described, the combination with mechanism for applying fastener devices to an envelop body and an envelop flap in a predetermined relation to each other and to the fold of the flap, of means for automatically feeding envelops one by one to a fastener receiving position, and for removing envelops from fastener receiving position after the operation of the fastener applying mechanism.

19. In a machine of the character described the combination with mechanism for applying fastener devices to an envelop body and an envelop flap in a predetermined relation to each other and to the fold of the flap, of means for automatically feeding envelops one by one to a fastener receiving position, comprising a series of carriers movable to and from fastener receiving position, and means for applying an envelop to a carrier prior to the movement of the carrier to fastener receiving position, and means for removing the envelop from the carrier.

20. In a machine of the character described, the combination with mechanism for applying fastener devices to an envelop body and an envelop flap in predetermined relation to each other and to the fold of the flap, envelop loading mechanism, and envelop removing mechanism, of a series of carriers movable successively to position in operative relation to said envelop loading, fastener applying and envelop removing mechanism.

21. In a machine of the character described, the combination with mechanism for applying fastener devices to an envelop body and an envelop flap in predetermined relation to each other and to the fold of the flap, envelop loading mechanism, and envelop removing mechanism, of a series of carriers movable successively to position in operative relation to said envelop loading, fastener applying and envelop removing mechanism, all three mechanisms being arranged to operate simultaneously in connection with different carriers.

22. In a machine of the character described, the combination with mechanism for applying fastener devices to an envelop body and an envelop flap in predetermined relation to each other and to the fold of the flap, of means for automatically feeding envelops one by one to fastener receiving position, comprising a carrier movable to and from fastener receiving position and having an anvil receivable into the envelop carried thereby, with which anvil said fastener applying mechanism is arranged to cooperate to apply to a fastener element to the envelop body.

23. In a machine of the character described, the combination with mechanism for applying fastener devices to an envelop body and an envelop flap in predetermined relation to each other and to the fold of the flap, of means for automatically feeding envelops one by one to fastener receiving position, comprising a carrier movable to and from fastener receiving position and having an anvil receivable into the envelop carried thereby, with which anvil said fastener applying mechanism is arranged to cooperate to apply a fastener element to the envelope body, and means for applying an envelope to said carrier prior to its movement to fastener receiving position and for removing an envelop from said carrier after its movement from fastener receiving position.

24. In a machine of the character described, the combination with mechanism for applying fastener devices to an envelop body and an envelop flap in predetermined relation to each other and to the fold of the flap, of means for automatically feeding envelops one by one to fastener receiving position, comprising a series of carriers each carrier having an anvil receivable into the envelop carried thereby, and with which anvil said fastener applying mechanism is arranged to cooperate to apply a fastener element, and means for moving said carriers successively to and registering them in fastener receiving position.

25. In a machine of the character described, the combination with mechanism for applying fastener devices to an envelop body and an envelop flap in predetermined relation to each other and to the fold of the flap, of means for automatically feeding envelops one by one to fastener receiving position, comprising a series of carriers each carrier having an anvil receivable into the envelop carried thereby, and with which anvil said fastener applying mechanism is arranged to cooperate to apply a fastener element, and registering devices, movable into engagement with the carrier to insure correct positioning of the carrier during the fastener applying operation.

26. In a machine of the character described, the combination with mechanism for applying fastener devices to an envelop body and an envelop flap in predetermined relation to each other and to the fold of the flap, of means for conveying envelops successively to fastener receiving position comprising a series of carriers, each carrier comprising separable arms and an anvil receivable within an envelop and having means for yieldingly spreading the arms to frictionally support the envelop in predetermined relation to the anvil, and means for registering the carrier with respect to the fastener applying mechanism.

27. In a machine of the character described, the combination with mechanism for applying fastener devices to an envelop body and an envelop flap in predetermined relation to each other and to the fold of the flap, of means for feeding envelops one by one to and from fastener receiving position comprising a series of carriers each carrier having arms arranged to enter an envelop and engage the folds thereof to support the envelop in predetermined position and means movable into engagement with the envelop when in fastener receiving position to move the envelop on the carrier to registered position with relation to the fastener applying mechanism.

28. In apparatus of the character described the combination with means for applying a fastener to the body of an envelop and clenching it against the inside of the envelop of means for feeding envelops one by one from a stack to position for operation thereon by said fastener applying means.

29. In apparatus of the character described the combination with means for applying a fastener to the body of an envelop and clenching it against the inside of the envelop of means for feeding envelops one by one from a stack to position for operation thereon by said fastener applying means and means for registering said envelop with respect to the fastener applying means when in fastener receiving position.

30. In apparatus of the character described, in combination, a set and an anvil cooperating therewith to affix a fastener to the body of an envelop, said anvil being movable to and from operative position, and means for causing a relative movement between an envelop and the anvil to cause the anvil to enter the envelop.

31. In apparatus of the character described, in combination, a set and an anvil cooperating therewith to affix a fastener to the body of an envelop, said anvil being movable to and from operative position, means for feeding an envelop to fastener receiving position and for causing a relative movement between the anvil and envelop to cause the anvil to enter the envelop.

32. In apparatus of the character described, the combination with means for applying the fasteners, of article feeding means comprising a carrier, means for positioning an article on the carrier and for moving the carrier with the article thereon to position to receive a fastener.

33. A continuously operating automatic machine comprising means for applying fasteners to envelop bodies and means for feeding envelops sucessively from a supply to position for operation thereon by said fastener applying means including an anvil movable with an envelop.

34. In apparatus of the character described for applying closure fasteners to containers, the combination with fastener applying means for feeding containers one by one to said fastener applying mechanism and holding them in position for operation thereon including a series of anvils movable with successive containers.

35. In apparatus of the character described, in combination, means for feeding and affixing eyelets to one wall of a container said means comprising opposed setting devices one of which is movable into and from operative position, means for placing a container in operative relation to said movable setting device and means for moving the container and movable setting device into cooperative relation to the companion setting device.

36. In apparatus of the character described, means for feeding and affixing eyelets to one wall of an envelop comprising an eyelet set and an anvil, one of which is movable to and from operative position, and is arranged to be received into the envelope while away from operative position and to move with the envelop to operative position.

37. In apparatus of the character described, a fastener set and a plurality of movable anvils movable successively into cooperative relation to said set, and means for feeding envelops successively into cooperative relation with successive anvils and the set.

38. In apparatus of the character described, in combination, a fastener setting device and an anvil movable laterally to and from cooperative relation to said setting device, and means for feeding envelops successively into position to be operated upon by said setting device cooperating with said anvil.

39. In a machine for applying a fastener to an envelop, the combination with a horn arranged to enter the envelop and an anvil carried thereby, of a fastener affixing plunger arranged to cooperate with said anvil to apply a fastener to the envelope, together with an abutment movable into position opposite the fastener affixing plunger to support said anvil during the fastener affixing operation.

40. In a machine for applying a fastener to an envelop, in combination, a horn arranged to enter an envelop, an anvil carried by said horn, a fastener affixing means arranged to clench a fastener against said anvil and an abutment movable against the rear face of said horn to support the same during the fastener clenching operation.

41. In a machine for affixing a fastener to an envelop, in combination, a horn arranged to enter an envelop, a plurality of plungers movable toward said horn from opposite sides to apply fastening devices to an envelop and to support the horn during said operation.

42. In a machine of the character described, in combination, a carrier movable to and from fastener affixing position, a fastener affixing plunger movable toward and from said carrier to apply a fastener to an envelop carried thereby, and an abutment movable against said carrier to support the same during the fastener affixing operation.

43. In apparatus of the character described, in combination, an envelop carrier movable to and from fastener applying position, fastener affixing devices for applying a fastener to the body of an envelop clenching it within the envelop, comprising a fastener affixing plunger and an opposed abutment plunger.

44. In apparatus for applying fasteners to an envelop, a movable horn arranged to enter the envelop and an anvil adjustably mounted in said horn.

45. In apparatus for applying fasteners to an envelop a horn, means for automatically applying an envelop to said horn with the horn within the envelop and an anvil adustably mounted on said horn.

46. In apparatus for applying fasteners to an envelop means for automatically feeding envelopes from a stack to a carrier, said carrier being arranged to carry envelopes one by one to position for operation thereon and means for operating on said envelopes when in operative position substantially as and for the purpose described.

In testimony whereof, I have signed my name to this specification this 14th day of August, 1923.

JAY G. SWAB.